(12) United States Patent
Lading

(10) Patent No.: US 8,939,725 B2
(45) Date of Patent: Jan. 27, 2015

(54) AUTONOMIC ROTOR SYSTEM FOR AN AIRCRAFT

(75) Inventor: Gert Lading, Randers NV (DK)

(73) Assignee: HeliScandia ApS, Randers SV (DK)

( * ) Notice: Subject to any disclaimer, the term of this patent is extended or adjusted under 35 U.S.C. 154(b) by 671 days.

(21) Appl. No.: 12/734,528

(22) PCT Filed: Nov. 6, 2008

(86) PCT No.: PCT/DK2008/050268
§ 371 (c)(1),
(2), (4) Date: May 14, 2010

(87) PCT Pub. No.: WO2009/059608
PCT Pub. Date: May 14, 2009

(65) Prior Publication Data
US 2010/0260607 A1 Oct. 14, 2010

(30) Foreign Application Priority Data
Nov. 7, 2007 (DK) .................................. 2007 01575

(51) Int. Cl.
*B64C 27/18* (2006.01)
*B64C 27/52* (2006.01)
(52) U.S. Cl.
CPC ................. *B64C 27/52* (2013.01); *B64C 27/18* (2013.01)
USPC ........................................ 416/20 R; 415/80
(58) Field of Classification Search
CPC ........ B64C 27/52; B64C 27/18; B64C 27/06; B64C 27/12
USPC ........... 415/83; 416/210 R, 83; 60/39.43, 268
See application file for complete search history.

(56) References Cited

U.S. PATENT DOCUMENTS

| | | | | |
|---|---|---|---|---|
| 382,279 | A | * | 5/1888 | Tesla .............................. 318/727 |
| 3,052,305 | A | * | 9/1962 | Jones et al. ...................... 416/21 |
| 4,193,568 | A | * | 3/1980 | Heuvel .......................... 244/23 C |
| 4,702,437 | A | * | 10/1987 | Stearns, Jr. .................. 244/17.11 |

(Continued)

FOREIGN PATENT DOCUMENTS

| DE | 2029733 | 6/1969 |
|---|---|---|
| DE | 3 534 859 | 6/1987 |

(Continued)

OTHER PUBLICATIONS

Development of a Rotor-Body Coupled Analysis for an Active Mount Aeroelastic Rotor Testbed by Matthew L. Wilbur, NASA/TP-1998-208433, ARL-TR-1313, Jun. 1998.*

(Continued)

*Primary Examiner* — Ninh H Nguyen
*Assistant Examiner* — Jeffrey A Brownson
(74) *Attorney, Agent, or Firm* — James Creighton Wray

(57) ABSTRACT

A rotor system for an aircraft including a rotor (1) with a drive part (2) mounted rotatable about a rotation axis (8) and supporting the proximal end (9) of at least one rotor blade (3). The rotor system comprises a jet turbine (4) for providing pressurized exhaust gas to a rotary structure (7) having at least one jet nozzle outlet (6) and at least one jet stream duct (5) for transporting the pressurized exhaust gas from the turbine (4) to the jet nozzle outlet (6) to cause rotation of the rotary structure (7) by expelling the pressurized exhaust gas through the nozzle outlet (6). In addition, only the rotary structure (7) and not the rotor blade (3) comprise a jet stream duct (5) and a nozzle outlet (6).

11 Claims, 9 Drawing Sheets

(56) References Cited

U.S. PATENT DOCUMENTS

| | | | |
|---|---|---|---|
| 5,984,635 A | 11/1999 | Keller | |
| 7,062,900 B1* | 6/2006 | Brun | 60/39.35 |
| 7,806,697 B2* | 10/2010 | Mallaci et al. | 434/372 |
| 2005/0151005 A1 | 7/2005 | Isley | |
| 2006/0107663 A1* | 5/2006 | Filippone | 60/643 |
| 2010/0090055 A1* | 4/2010 | Smith et al. | 244/17.27 |

FOREIGN PATENT DOCUMENTS

| | | | | |
|---|---|---|---|---|
| DE | 3534859 | | 6/1987 | |
| EP | 1832511 | | 1/2004 | |
| EP | 1832511 | * | 9/2007 | B64C 27/12 |
| FR | 1424495 | * | 1/1966 | B64C 27/18 |
| GB | 1 229 577 | | 4/1971 | |
| GB | 1229577 | | 4/1971 | |
| JP | 06-008888 | | 1/1994 | |
| JP | 2004-248461 | | 9/2004 | |
| RU | 2064067 | | 7/1996 | |
| RU | 2072057 | | 1/1997 | |
| RU | 2109656 | | 4/1998 | |
| RU | 2156208 | | 9/2000 | |
| WO | WO0134466 | | 5/2001 | |
| WO | 2004002824 | | 1/2004 | |

OTHER PUBLICATIONS

Pentagon Selects New Foreign Weapon Systems for Evaluation; Oct. 1, 1988; Aviation Week and Space Technology, p. 30; XP000025933; ISSN: 0005-2175; MacGraw-Hill Company, New York, NY.

* cited by examiner

AUTONOMIC ROTOR SYSTEM FOR AN AIRCRAFT

This application claims the benefit of Danish Application No. PA 2007 01575 filed Nov. 7, 2007 and PCT/DK2008/050268 filed Nov. 6, 2008, and the amended sheets from the IPER, which are hereby incorporated by reference in their entirety as if fully set forth herein.

FIELD OF THE INVENTION

The invention concerns a rotor system for an aircraft including a rotor with a rotary structure mounted rotatable about a rotation axis and supporting proximal ends of rotor blades. The rotor system comprises a jet turbine for providing pressurised exhaust gas to the rotary structure having at least one jet nozzle outlet and at least one jet stream duct for transporting the pressurised exhaust gas from the turbine to the jet nozzle outlet to cause rotation of the rotary structure by expelling the pressurised exhaust gas through the nozzle outlet.

BACKGROUND OF THE INVENTION

Aircrafts which can takeoff and land vertically with a rotating wing, like a helicopter, are typically made in a configuration with a horizontally rotating main rotor and a vertically rotating tail rotor coupled to a gearbox and powered by a jet turbine engine. The vertical tail rotor is necessary for compensating the moment exerted by the main rotor on the body of the aircraft. The tail rotor, the gearbox and the coupling of these occupy much weight that otherwise could be useful load or otherwise could entail an energy saving.

Aircrafts are known that do not need the tail rotor and the gearbox and the coupling shafts, but where the rotor blades are powered by tip mounted ramjet engines that utilise the high speed at the tip of a rotary wing. However, it has appeared that the ramjet configuration is very noisy and energy consuming and has the disadvantage that the ramjet engines produce a highly luminous ring from the exhaust. Another system avoiding the tail rotor is disclosed in U.S. Pat. No. 4,702,437, where the rotor has exit nozzles powered by air form electro motors in each of the rotor blades and where the rotor is connected to the fuselage through a yaw control system which can rotate the shaft of the rotor relatively to the fuselage.

Another system is disclosed in German patent application DE 2029733 disclosing a helicopter with rotor wings having gas exit nozzles for driving the rotor, where the necessary gas is provided by a compressor driven by shaft from an electrical motor.

Also, there are other configurations where a jet turbine mounted in the body of the aircraft produces compressed air conducted to nozzles at the tip of the rotary wing or to the central part of the rotor as disclosed in FR 1424495. However, this necessitates complicated technology and produces great losses.

Alternatively, as disclosed in U.S. Pat. No. 3,052,305 by Jones et al., a helicopter is disclosed with a gas turbine mounted concentrically on the rotor assembly and rotating therewith. The combustion gases from the engine are led out to the blade tips and ejected tangentially to cause rotation of the rotor. Another alternative is disclosed in U.S. Pat. No. 5,984,635 by Keller, where a helicopter has an upper hollow centre circular plenum in gaseous communication with a plurality of hollow rotor blades. Pressurized gas from two jet engines adjacent to the helicopter body is supplied to the blades and ejected tangentially at the tip of the blades.

An even further alternative is disclosed in British patent application GB 1 229 577 by Eyre, where a helicopter is provided with cylindrical blades having a gas exit substantially along the entire length of the blades. Gas is provided from two gas turbines in the rotor hub above the cabin of the helicopter. This system has the advantage of being light weight due to the lack of gearing and transmission shafts. However, this system suffers from the fact that these cylindrical blades—which are far from today's aerodynamic blade profiles—have not yet been practically proven as being safe during use.

All these prior art systems are specialised systems that have a lack of general versatility and scalability.

A further system is disclosed in French patent FR 1.424.495 by Galy disclosing a helicopter with a rotor in which the exhaust nozzles of the rotor are closer to the central axis than the inner ends of the wings. The exhaust nozzles are fed with gas from a jet turbine which is provided on the back of the aircraft and connected to the rotor through a piping system.

Hereby is achieved that the rotor system is a simplified system by having a clear division of a drive part, including the rotary structure and the turbine, and one or more rotor blades. A clear division of technology is provided so that the drive part and the rotor blades may be developed and produced separately. For the same drive part, different sized rotor blades or type of rotor blades may be provided and attached to the rotary structure of the drive part. Thus, the drive part is a universal solution for a versatile rotor construction that can be easily scaled, adapted and re-used in other configurations without amending the drive part and only by mounting rotor blades with appropriate dimensions. Actually, conventional prior art helicopter rotor blades may be mounted to the drive part according to the invention.

The drive part has a rotary structure which holds the proximal end of at least one rotor blade—rather a plurality of rotor blades—and which gives the rotational driving force to the rotor blades to achieve a lift of the aircraft by the blades. Preferably, the rotary structure is constructed such that it favours minimum drag both in rotation and in forward flight and does not add to the lift of the system, or at least does not add any substantial lifting force to the system. The distance from the rotational axis to proximal end of the rotor blade is much smaller than the distance from the rotational axis to the distal end of the rotor blades. For example, the radius for the rotating rotary structure is less than half or less than one third of the radius of the entire rotor. Thus, typically, also the area spanned by the rotating rotor blades is much larger than the area spanned by the rotating rotary structure. In addition, the speed of the distal end of the rotor blade is much higher than the speed of the rotary structure due to the larger distance from the rotation axis. Therefore, the lift of the rotor blades is the entire or at least main cause for the lifting force.

An alternative rotor system for an aircraft is disclosed in EP 1 832 511 disclosing a rotor which is magnetically coupled to an outer ring in order to avoid the rotating shaft normally employed in helicopters.

OBJECT OF THE INVENTION

It is the object of the invention to provide a universal helicopter rotor system without the need of gearbox and transmission shafts, and utilises the well known versatility of the state of the art aerodynamic rotor blades.

DESCRIPTION OF THE INVENTION

This object is achieved with a rotor system that is divided into an innermost driving part and an outermost conventional rotor blade part. The innermost driving part contains a jet turbine from where the jet stream is conducted through ducts to jet nozzles disposed before the beginning of the rotor blade part.

In structural details, the invention is a rotor system for an aircraft including a rotary structure mounted rotatable about a rotation axis and supporting a proximal end of at least one rotor blade. The rotor system also comprises a jet turbine for providing pressurised exhaust gas to the rotary structure, which has at least one jet nozzle outlet and at least one jet stream duct for transporting the pressurised exhaust gas from the turbine to the jet nozzle outlet. The pressurised exhaust gas is expelled through the nozzle outlet from the rotary structure which causes rotation thereof. Preferably, the expelling of the gas is in a tangential direction relative to the rotation, like in prior art systems. In contrast to the aforementioned prior art system disclosed in British patent specification GB 1 229 577 by Eyre, only the rotary structure and not the rotor blade comprises a jet stream duct and a nozzle outlet.

A radial jet turbine useful in connection with the aircraft is disclosed in U.S. Pat. No. 7,062,900 by Klaus Brun, although the use of this turbine for an aircraft has never been disclosed before.

The rotor system is autonomic, and its support structure can be attached to an aircraft body only requiring connection of tubes, preferably flexible tubes, for fuel and electric wiring, whereby a substantial weight reduction is attained since there is no need for a heavy gearbox with associated transmission shafts etc. Also, the jet stream is utilised directly without any transformation to another form of energy, e.g. mechanical torsion, whereby by transformation losses are eliminated.

Non exclusive examples of aircraft bodies in the above sense are cabins for people, unmanned cargo containers, or containers with equipment for taking photos or measurements during flight.

Primarily, the rotor system according to the invention is intended as a rotary wing for a helicopter aircraft. However, the invention has general character and can likewise be used for airplane propellers.

By dividing the drive part and the rotor blade part at e.g. 40% of the length of the rotor, only 17% of the lifting disc area is lost, which may be replaced by only 9% longer rotor blade part at the outermost section. Relative to prior art systems, where the exhaust nozzles are at the blade tip, the jet nozzle speed is reduced correspondingly by locating it more close to the rotary axis. This increases the efficiency of the system according to the invention.

Preferably, the drive part comprises a radial-flow jet turbine which is integrated in the rotor system so that it is disposed coaxially with the rotary axis of the rotary structure. Optionally, jet disc has turbine blades provided in a plane of the ducts of the rotary structure.

For example, the jet turbine has a support structure with a first side for non-rotational connection to an aircraft body and with an opposite, second side, which is rotationally coupled to a radial flow jet disc with compressor blades, and wherein an inlet opening for inlet of air is provided on the second side of the support structure.

The drive part with the jet turbine comprises a rotating jet disc, the rotary structure and a support structure. The jet turbine is designed so that the combustion chamber is solidly connected to the support structure and thereby directly connected to fuel and control means without any complicated rotary couplings. This is made possible by the following construction. The jet turbine comprises a rotating jet disc with a base on which compressor blades are provided. The compressor blades have an adjacent part fastened to the base and a distal part being distal from the base. On the distal parts of the compressor blades, a disc member is provided connecting the distal parts of the compressor blades with the turbine blades. The air from the compressor blades to the combustion chamber and the combustion gas from the combustion chamber to the turbine blades flows in the space between the base and the disc member.

Advantageously, the jet turbine may have an integrated permanent magnet electromagnetic motor as start and generator means. The rotating jet disc includes magnets and the support structure of the rotor system includes electromagnets which hereby can have direct electrical connection to regulating means. The start and generator means hereby only has magnetic coupling between the support structure and the rotating part of the jet turbine, whereby complicated rotary couplings are avoided.

When the rotor system is used for a helicopter type aircraft, the yaw of the aircraft may be regulated in relation to the angular momentum of the rotor by means of an integrated permanent magnet electromagnetic motor. The rotary structure contains magnets, and the support structure contains the electromagnets. According to the invention, the electromagnets are directly electrically connected with regulating means for control of relative movement between the rotary structure and the support structure. Hereby, the yaw of the aircraft only has a magnetic coupling between the support structure and the rotor.

An alternative exemplary embodiment of the electric motors for both the start and generator means and electric motor for the regulation of yaw can be a fulfilled as an asynchronous (induction) motor with a cage rotor, instead of the permanent magnets. The cage rotor will, however, take the distal position in relation to the electromagnets in the characterizing structure. For example, it could be beneficial to take advantage of the cage rotors natural ability to adapt itself to the number of poles in the stator. Also the cage rotors slip property reduces the tear and wear on the mechanics giving a lower peak torque.

The drive part for the rotor according to this invention may carry an inlet opening protective means, for example a hood, which is fastened to the support structure of the rotary blade system. Fastening it to the support structure entails that the air intake of the hood will point in a direction determined by the support structure, for example in the same direction as the flying direction of the aircraft. Particularly, when flying at high speed, this hood will stabilise the air stream to the inlet opening of the jet turbine.

The rotor system is scaleable to more than one rotor blade and to more than one jet turbine. An example is a five rotor blade configuration and with two jet turbines. The two jet turbines may be disposed in a back-to-back configuration, and the two turbine configuration gains redundancy.

Attitude control of a helicopter, e.g. banking, most often occurs by cyclic pitch control where the pitch angle of the rotary blade is continuously varied during the movement of the blade in the plane of rotation. As the rotor system according to the present invention is autonomic and only needs flexible connections to the body of the aircraft, the attitude may be controlled by a six-legged suspension connecting the support structure of and the aircraft. A six-legged suspension is also called a hexapod and is invented by V. Gough in 1955. The six legs are longitudinally extendable actuators which provide six-axis freedom for the rotor system in relation to the aircraft body. Furthermore, this provides the possibility of simplified fixed pitch angle for the rotor blade parts, and the resulting lifting force from the rotary wing may be regulated by the rotational speed. This entails a substantial simplification of the rotary wing, as there is no need for a complex collective- and cyclic pitch control mechanism.

The six-legged suspension at the rotor system incorporates built-in redundancy in case of actuator failure. The regulating means may compensate for a failing actuator by calculating an alternative setting for the functioning actuators. This will result in a situation where the rotary wing will assume an alternative level relative to the aircraft body, which will be without significance to airworthiness. By simultaneous failure of two actuators, it will still be possible to manoeuvre the aircraft, however without trim.

As the autonomic rotor system suspended in a hexapod according to the present invention constitutes all control means of the aircraft, the body of the aircraft may be freely designed. The aircraft body may e.g. be designed as a circular dome pointing in an arbitrary direction, independent of the flight direction. The aircraft may be an unmanned aircraft for military reconnaissance tasks. The dome may here be a sensor dome with optical sensors that may point in an arbitrary direction, independently of the flight direction. The dome may be a radar antenna and rotate with independent rotary speed.

In summary, the present invention concerns an autonomic rotary wing for an aircraft which is divided into a drive part and a rotor blade part. The drive part contains an integrated jet turbine. The integrated jet turbine only contains one member rotating—the jet disc—relative to a support structure. Start and generator means may be incorporated in a simple way by providing electromagnets to the support structure and permanent magnets to the jet disc. The rotor system may be further simplified by a fixed pitch setting of the rotary blades and by simple rotational speed control for controlling total resulting lifting force. The system also contains means for yawing the aircraft by utilising the angular momentum of the rotor and suspending the rotor in a hexapod will constitute all attitude control means for the aircraft and the body of the aircraft may then assume an arbitrary form without the need of a tail. The rotary blade structure is an autonomic unit, and the body of the aircraft may be designed freely and independently.

The autonomic rotor system, which is scaleable, may be applied to all types of aircraft where vertical takeoff and landing is required. They may be aircraft, like helicopters, for transporting persons and goods, but also unmanned aircraft for military reconnaissance and scouting tasks. Since the rotor system according to the present invention constitutes all control means for the aircraft and e.g. does not need a tail part, the aircraft body may be designed freely. Also, the aircraft may be a sensor pod which may point in any direction independent of the flight direction. The aircraft may e.g. be a radar antenna in an aerodynamic envelope which rotates with an independent rotational speed.

In the following, four embodiments independent from the aforementioned invention are described. Two or more of these four alternatives can be mutually combined.

Alternative 1—the Drive Part Used for a Blade with Nozzle at the Tip

As explained above, the drive part comprises the jet turbine, the rotary structure and the support structure. By a slight modification of the rotary structure, the drive part may be used for prior art rotor blades that have gas stream exit nozzles at the blade tip, for example as disclosed in U.S. Pat. No. 5,984,635. The modification needed is a coupling between the ducts in the rotary structure and the ducts in the blades. In this case, the ducts do not end at an exit nozzle of the rotary structure but ends in the coupling with the blade.

In this case, this independent embodiment can be described as a rotor system for an aircraft including a rotor with a rotary structure mounted rotary about a rotation axis and supporting a proximal end of at least one rotor blade. The rotor system comprises a jet turbine for providing pressurised exhaust gas to the rotary structure and further into the at least one rotor blade, which is provided with a jet nozzle outlet and a jet stream duct for transporting the pressurised exhaust gas from the turbine and the rotary structure to the jet nozzle outlet to cause rotation of the rotary structure with the at least one rotor blade by expelling the pressurised exhaust gas through the nozzle outlet provided in the blade surface, for example at the blade tip.

Preferably, the jet turbine is a radial flow type jet turbine located coaxially with the rotary axis of the rotary structure. Optionally, the jet turbine has a support structure with a first side for non-rotational connection to an aircraft body and with an opposite, second side, which is rotationally coupled to a radial flow jet disc with compressor blades. An inlet opening for inlet of air may be provided on the second side of the support structure.

Optionally, the jet disc has a base on which compressor blades are provided, the compressor blades having an adjacent part fastened to the base and a distal part being distal from the base, wherein on the distal parts of the compressor blades a disc member is provided connecting the distal parts of the compressor blades with turbine blades, and wherein a combustion chamber for the jet turbine is provided on the support structure.

The rotary structure is rotationally coupled to the support structure, preferably through an electromagnetic motor, for example a starter or generator or both. Such a electromagnetic motor may comprise at least one permanent magnet on the rotary structure and at least one electromagnet on the support structure. Advantageously, the electromagnet is electrically connected to regulating means for regulating the yaw of the support structure relative to the rotary structure. An alternative exemplary embodiment, the electric motor for the regulation of yaw can be a fulfilled as an asynchronous (induction) motor with a cage rotor, instead of the permanent magnets.

Optionally, inlet opening protecting means is provided partly covering the inlet opening and being fastened with a stationary connection to the support structure.

It is possible that the at least one rotor blade is connected to the rotary structure with a stationary pitch angle as also explained above.

Such a modified rotor system can be used in combination with a 6-legged suspension as described above.

Also, such a modified rotor system can be used in combination with an aircraft body in the form of circular dome as described above.

Alternative 2—the Jet Turbine

The construction of the jet turbine is useful in connection with the rotary structure having gas nozzle outlets. However, this is not necessary for the functioning of the jet turbine itself.

Thus, this independent embodiment may be described as a jet turbine having a support structure with a first side for non-rotational connection to a body, for example an aircraft body, and with an opposite, second side, which is rotationally coupled to a radial flow jet disc with compressor blades. An inlet opening for inlet of air is provided on the second side of the support structure.

Optionally, the jet disc has a base on which compressor blades are provided, the compressor blades having an adjacent part fastened to the base and a distal part being distal from the base, wherein on the distal parts of the compressor blades a disc member is provided connecting the distal parts of the compressor blades with turbine blades, and wherein a combustion chamber for the jet turbine is provided on the support structure.

The jet turbine may be provided with start and generator means where magnets are provided in the radial flow jet disc and electromagnets are provided in the support structure cooperating with the magnets. The electromagnets are electrically connected to regulating means, and hereby the start and generator means only has a magnetic coupling between the support structure and the jet disk. An alternative exemplary embodiment of the electric motors for both the start and generator means can be a fulfilled as an asynchronous (induction) motor with a cage rotor, instead of the permanent magnets.

The support structure may be a stationary support.

A rotary structure from an aircraft may be rotationally coupled to the support structure, preferably through an electromagnetic motor. Such an electromagnetic motor may comprise at least one permanent magnet on the rotary structure and at least one electromagnet on the support structure. Advantageously, the electromagnet is electrically connected to regulating means for regulating the yaw of the support structure relative to the rotary structure.

Optionally, inlet opening protecting means is provided partly covering the inlet opening and being fastened with a stationary connection to the support structure.

Such a jet turbine may also be combined with prior art helicopter rotors, for example integrated in the plenum housing of the system disclosed in U.S. Pat. No. 5,984,635 and connecting the rotor with the aircraft cabin. It may also substitute the turbine as disclosed in U.S. Pat. No. 3,052,305 or may be integrated in the rotor hub of British patent specification GB 1,229,557.

In addition, the jet turbine may be used without integration in an aircraft, but as a general jet turbine, where it is useful that a support structure, for example as a stationary part, is provided on one side of the rotating jet disc and the air intake is provided at an opposite side of the rotatable jet disk, especially in cases, where the combustion chamber is provided on the support structure and the compressor blades are connected with the turbine blades via the connecting disc member.

This jet turbine can advantageously be combined with alternative 1 above or be used in combination with a 6-legged suspension as described above and in Alternative 4 below. Also, it can be used in combination with an aircraft body in the form of circular dome as described above.

Alternative 3—Start and Generator Means for a Jet Turbine

The start and generator means for a jet turbine, for example as described under Alternative 2, may advantageously also be used in conventional jet turbines by inserting magnets into the jet rotor of the conventional jet turbine, for example into the rotating compressor blades, and by mounting electromagnets in the rotary plane of the magnets in a circle at the outer side of the jet turbine. If the electromagnets are electrically connected to regulating means, the start and generator means only have a magnetic coupling between the stationary and the rotary parts of the jet turbine, thus avoiding complicated couplings.

Alternative 4—the Hexapod

As disclosed above, the attitude control with the hexapod mechanism can also improve prior art helicopter systems if inserted between the rotor system and the helicopter cabin.

This independent embodiment can be described as an attitude control mechanism for insertion between an aircraft body, for example a cabin, and a rotor system of the aircraft, the attitude control mechanism comprising a 6-legged suspension with a first connection for connection to the rotor system and with a second connection for connection to an aircraft body, wherein the 6-legged suspension is designed as a hexapod with six legs, each leg comprising a longitudinally extendable actuator.

The hexapod may be combined with one or more of the three foregoing alternatives.

DESCRIPTION OF THE DRAWING

The rotary wing according to the invention is described below with reference to the figures in which exemplary embodiments are shown, wherein:

FIG. 1 shows the rotor system seen from above with a division into a drive part 2 and a rotor blade part 3. The drive part 2 contains the jet turbine 4 from which a jet stream is conducted into a rotary structure 7 through internal jet stream ducts 5 to jet nozzle outlets 6. The nozzle outlets 6 are designed so that the jet stream from the nozzle outlets 6 act perpendicularly to the longitudinal axis of the rotary structure 7 and in the plane of rotation in order to provide the greatest effect. The rotor 1 of the system comprises the rotary structure 7 and rotor blades 3 that are fastened with their proximal ends 9—opposite their distal ends—to the rotary structure 7 and rotate with the rotary structure 7 around a rotation axis 8.

FIG. 2 shows a sectional view of the radial flow type jet turbine 4. The drive part 2 of the rotor system consists mainly of three mechanical structures, which are:

Figure 1:
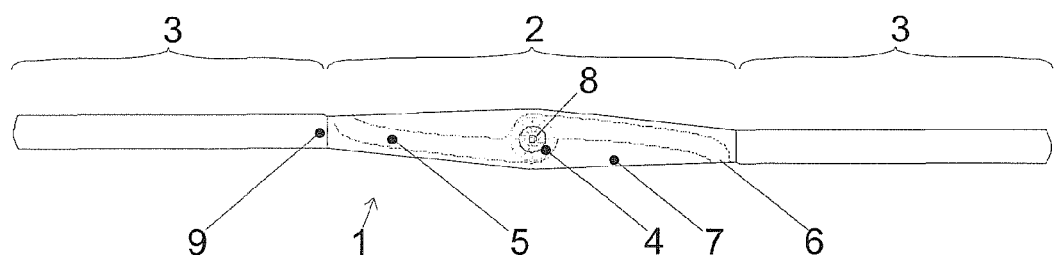
FIG. 1 shows the rotary wing from above with the characterising division and the main components.

a support structure 20, which is connected to the aircraft;

a rotary structure 7, which is rotating with the blades 3 around the rotation axis 8 and is coupled to the support structure 20 through an electric yaw motor 51 having magnets 18 and electromagnets 19;

and a radial flow jet disc 14, which is rotationally coupled to the support structure 20 through an electric starter/generator motor 50 having magnets 21 and electromagnets 22. The support structure 20 comprises a base 20' of the jet turbine 4.

Air is conducted into the jet disc 14 through the inlet opening 12 to the compressor blades 11 and onwards through the combustion chamber 16 to the turbine blades 17, from where the jet stream is conducted through the ducts 5 to the jet nozzle outlets 6. The combustion chamber 16 includes a diffuser system and an exhaust guide vane system.

Figure 2:
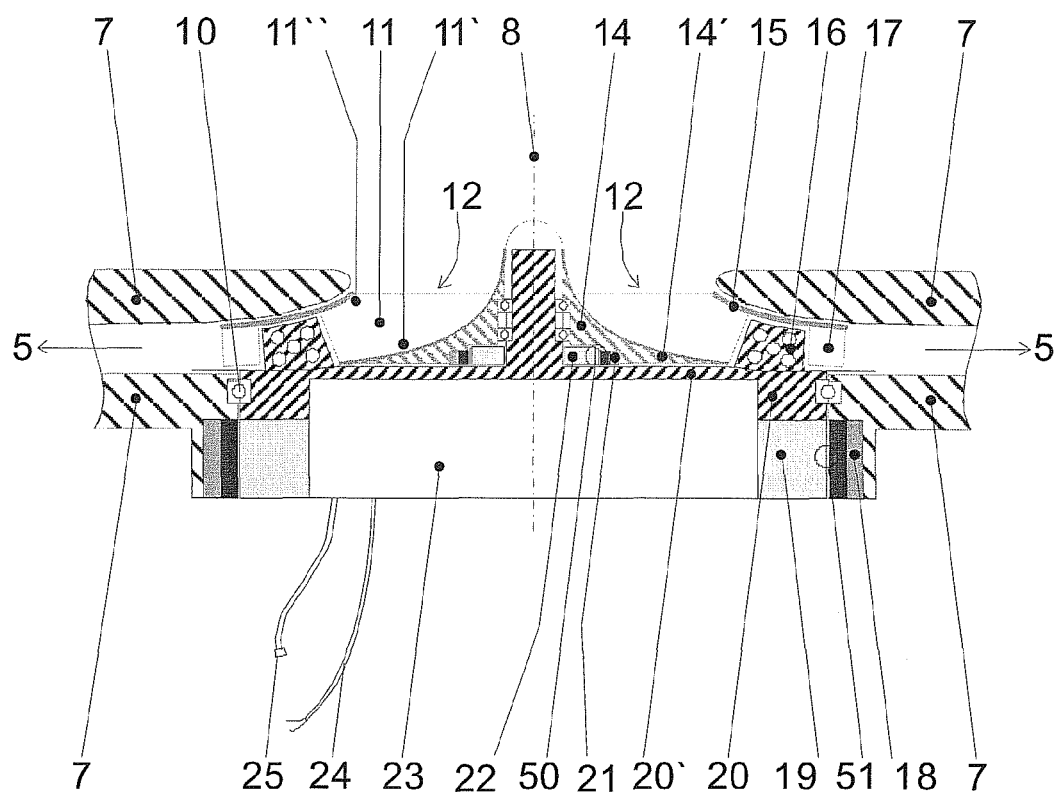
FIG. 2 shows a sectional view of the radial flow jet turbine disposed coaxially in the rotary axis of the rotary wing.

The characterising design of the jet disc 14 is seen on FIG. 2. The jet disc 14 has a disc base 14' on which compressor blades 11 are provided. The compressor blades 11 have an adjacent part 11' fastened to the disc base 14' and a distal part 11" being distal from the disc base 14'. On the distal parts 11" of the compressor blades 11, a disc member 15 is provided connecting the distal parts 11" of the compressor blades 11 with the turbine blades 17. The air from the compressor blades 11 to the combustion chamber 16 and the combustion gas from the combustion chamber 16 to the turbine blades 17 flows in the space between the disc base 14' and the disc member 15.

This design provides advantageously that the combustion chamber 16 is mounted solidly on the support structure 20, so that fuel supply 25, electric connections 24, and regulating means 23 do not have to extend through a rotary connection to the aircraft.

The jet turbine 4 according to the invention has integrated start means and generator means comprising a permanent magnet electric motor/generator 50 including magnets 21 and electromagnets 22. The rotating disc 14 contains the magnets 21, and the support structure 20 contains the electromagnets 22 electrically connected to regulating means 23.

The rotor system according to the invention may control the yaw of the aircraft by an integrated permanent magnet electric motor 51. The rotary structure 7 contains magnets 18 and the stationary support structure 20 contains electromagnets 19 electrically connected to the regulating means 23.

Because the radial directed pressurised exhaust gas from the jet turbine 4 expelled through the outlets 6 causes the rotation of the rotary structure 7 with the blades 2, no substantial rotational counter force is exerted in the support structure 20. Thus, in contrast to conventional helicopters, a tail rotor is not needed. Rotational adjustment of the cabin of the helicopter relatively to the earth (yaw) is achieved by advancing or retarding the rotation between the electromagnet 19 of the support structure 20 and the magnet 18 of the rotary structure 7.

Figure 3:
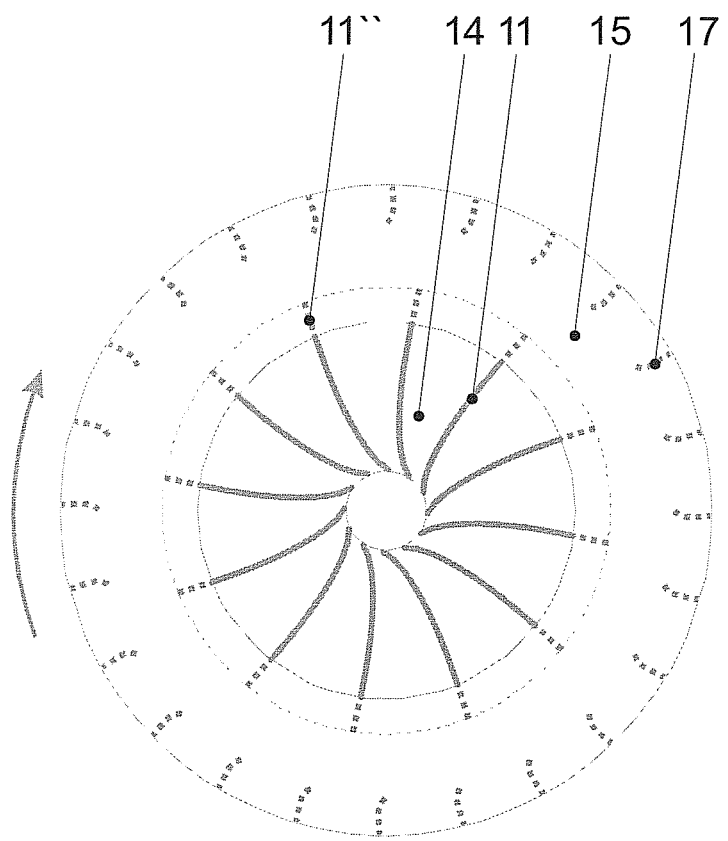
FIG. 3 shows the radial flow jet disc.

FIG. 3 shows an exemplary embodiment of the radial flow type jet disc 14, as seen from the inlet opening. The compressor blades 11 and the connecting disc 15 connect the distal part 11" of the compressor blades 11 with the turbine blades 17.

Figure 4:
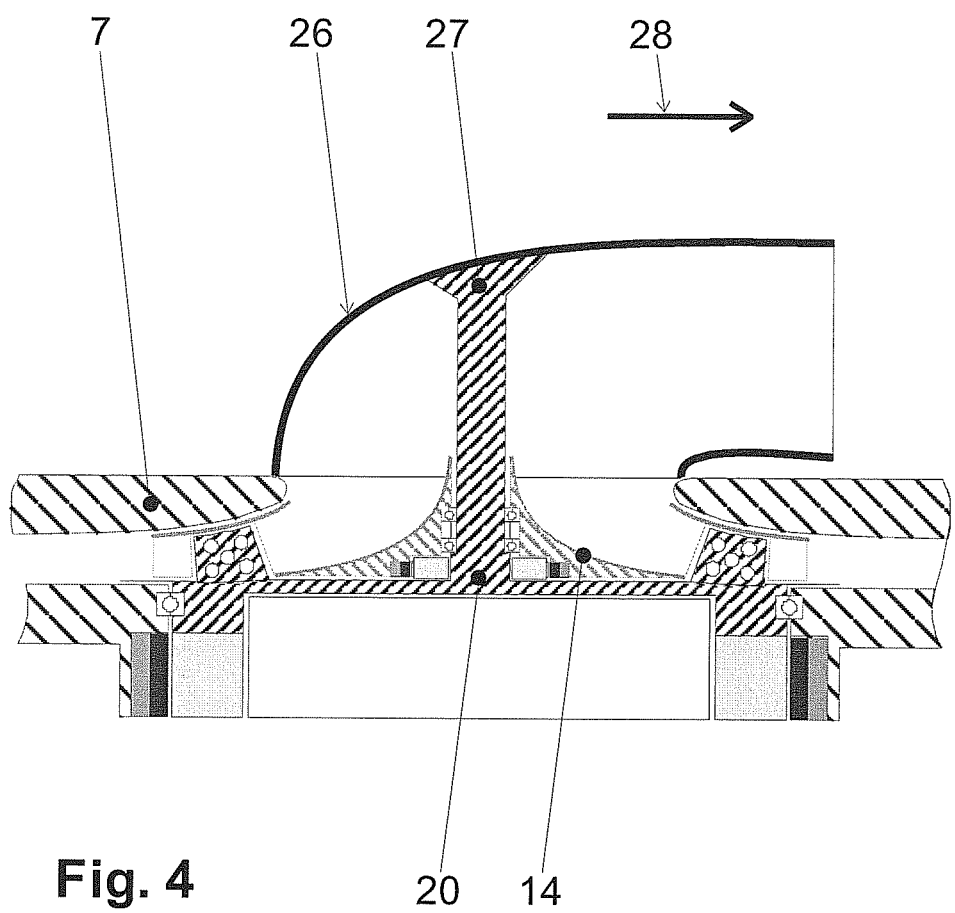
FIG. 4 shows the air inlet opening protective means.

FIG. 4 shows an exemplary embodiment with an air inlet protecting means 26 in the form of a cap, where the means 26 is fastened 27 to the support structure 20. Thus, the rotary structure 7 and the jet disc 14 rotate relatively to the cap 26. The arrow 28 shows the direction of flight.

Figure 5:
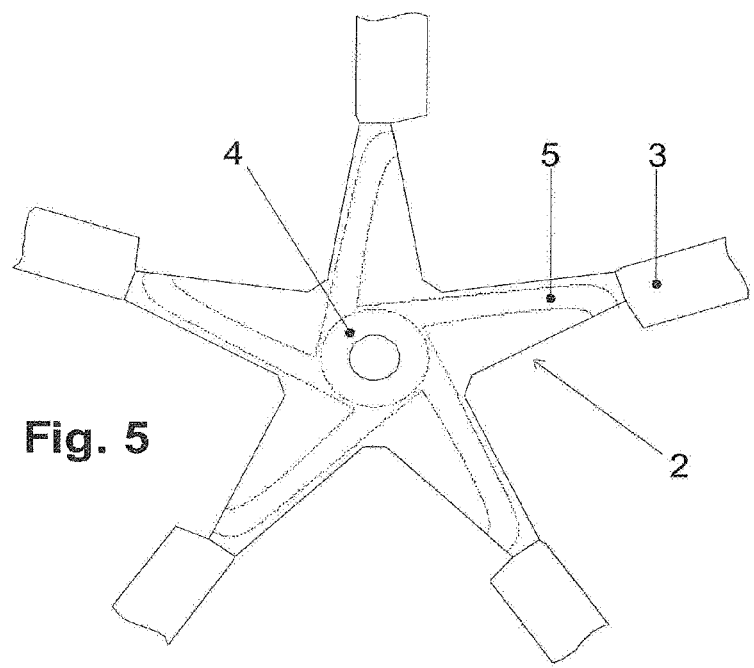
FIG. 5 shows a five wing exemplary embodiment of the rotary wing.

FIG. 5 shows an exemplary embodiment with the rotary wing in a five wing configuration of the rotary structure 7' and with the jet turbine 4 disposed coaxially in the rotational axis of the rotary structure 7'.

Figure 6:
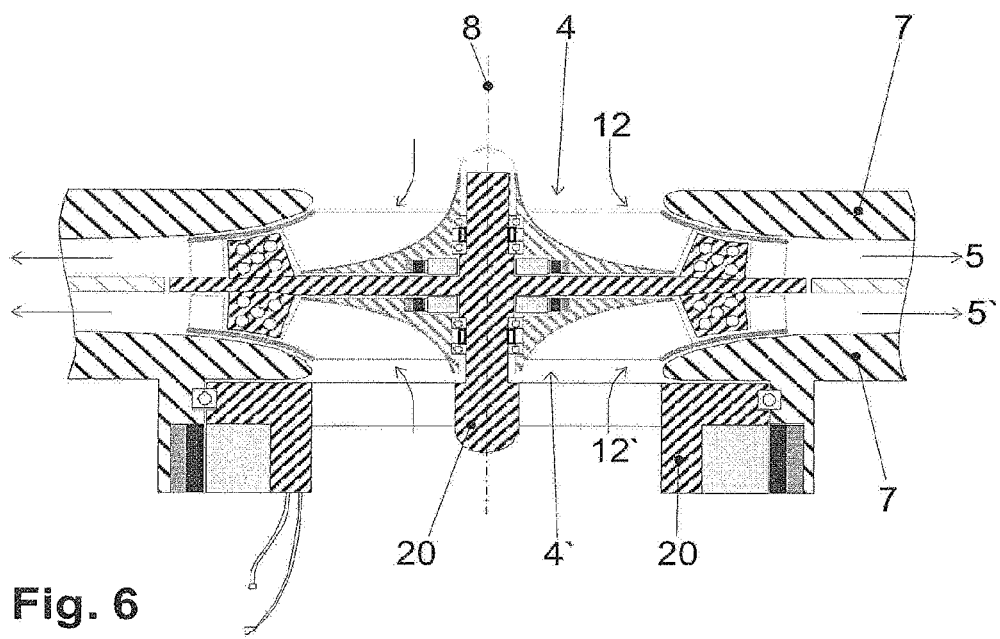
FIG. 6 shows two jet turbines in a back-to-back configuration exemplary embodiment.

FIG. 6 shows an exemplary embodiment of the jet turbines disposed in a back-to-back configuration with a second turbine 4' disposed coaxially in the rotational axis 8 of the rotary structure 7, which has two ducts 5, 5'. Whereas the first turbine has a first inlet opening 12, the second turbine 4' has a second inlet opening 12' at the opposite direction. The second turbine 4' is leading the exhaust gasses into the second internal duct 5' to the nozzle outlets.

Figure 7:
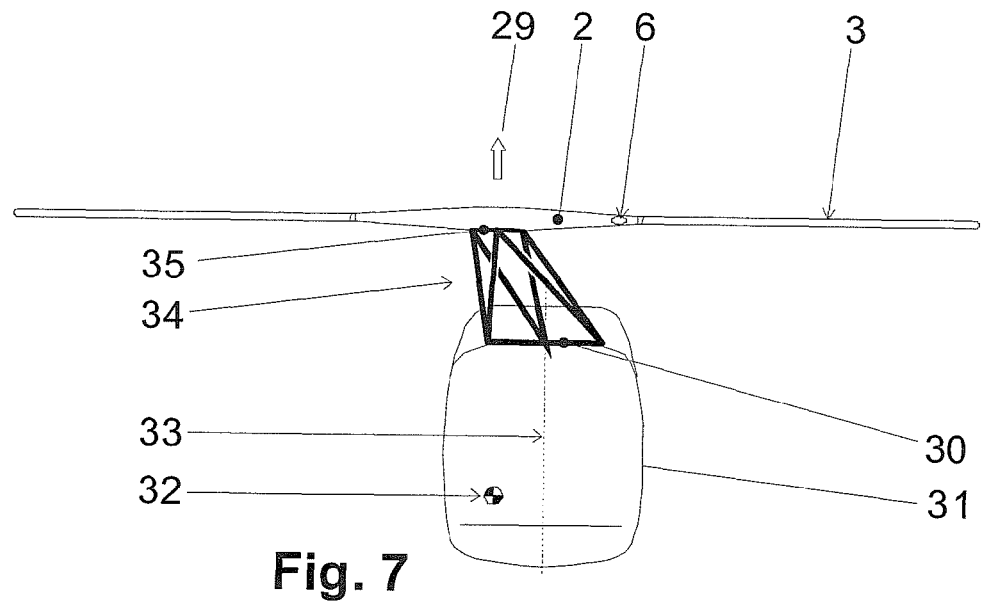
FIG. 7 shows a 6-leg suspension (hexapod) connecting the rotary wing and the aircraft body to the attitude control of the aircraft.

FIG. 7 shows an exemplary embodiment of an aircraft 31 with a rotor system according to the invention. The rotary blades 3 are fastened with a fixed pitch angle to the rotary structure 7 of the drive part 2. The resulting lifting force 29 from the drive part 2 in combination with the blades 3 is regulated by the rotational speed of the rotary structure 7. This is in contrast to traditional helicopters, where the resulting force is regulated by the collective- and cyclic-pitch angle.

The attitude of the aircraft 31 is controlled by a 6-leg suspension 34, where the 6-legged suspension 34 is made as a hexapod interconnecting the support structure 20 of the rotor system and the body 31 of the aircraft. Thus, the six legs are connected to the drive part 2 at three points and to the body 31 at three points such that each two adjacent legs have one common connection point at their one end and two different connection points at their opposite ends. The six legs 34 are longitudinally extendable actuators, where the reference triangle 30 is fastened to the body 31 of the aircraft, and where the 6-axis freely movable triangle 35, shown in greater detail in FIG. 8, is fastened to the support structure 20 of the drive part 2.

The situation in FIG. 7 is that the centre of gravity 32 of the aircraft body is displaced in relation to the vertical centre line 33 of the body 31 of the aircraft, and where the suspension 34 of the aircraft has offset the rotor system 1 laterally to a position directly above the centre of gravity 32, whereby the aircraft is in trim.

Figure 8:
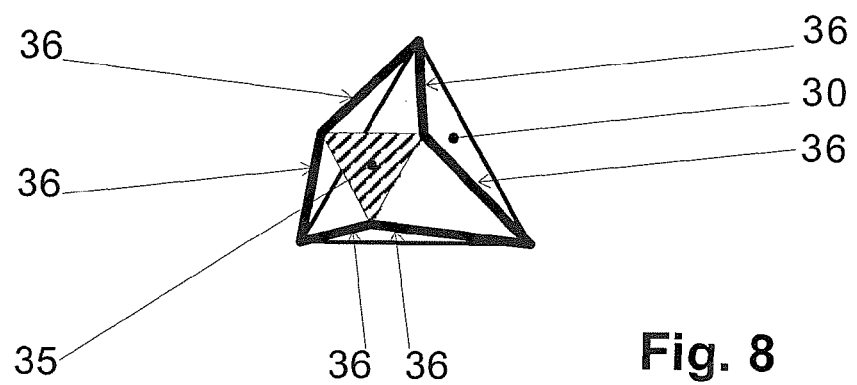
FIG. 8 shows a 6-leg suspension (hexapod) from a top view.

FIG. 8 shows the situation of FIG. 7 from a top view with the 6-axis freely movable triangle 35 displaced in relation to the reference triangle 30 by means of the six longitudinally extendable actuators 36.

Figure 9:
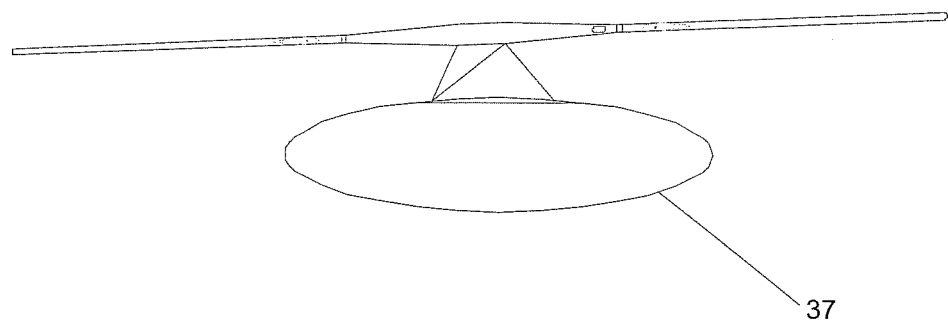
FIG. 9 shows an exemplary embodiment wherein the aircraft is designed as a circular sensor dome.

FIG. 9 shows the rotary wing mounted on an aircraft designed as a circular sensor dome 37, where the dome 37 may point in an arbitrary direction, independently of the flight direction. Also, the dome 37 may rotate horizontally around the centre of gravity of the dome 37 at an independent rotational speed.

Figure 10:
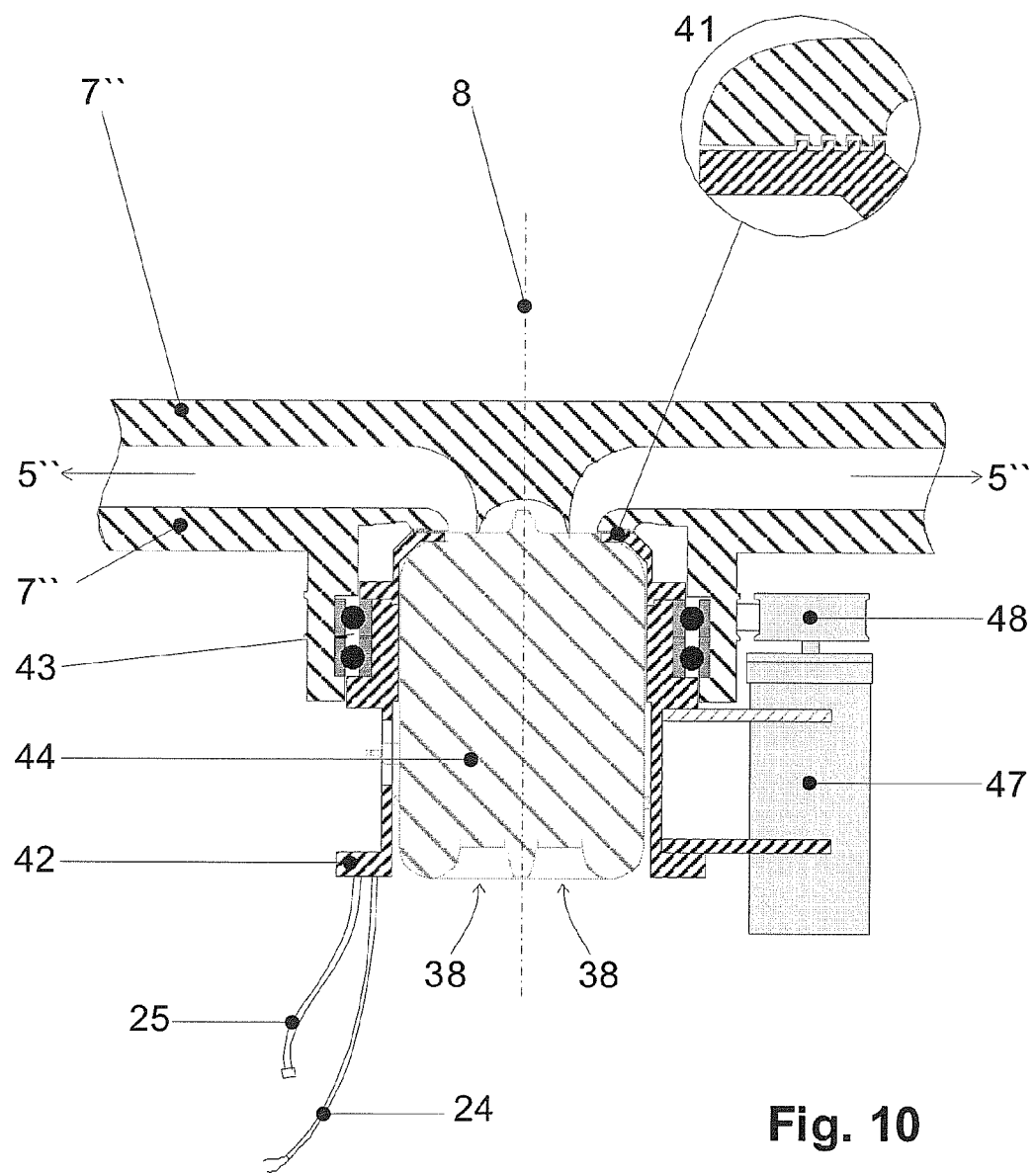
FIG. 10 shows a sectional view of a rotor system using a commercial off-the-shelf jet turbine.

FIG. 10 shows a sectional view of an exemplary embodiment the rotor system using a commercial off-the-shelf jet turbine 44, where the support structure 42 encloses the jet turbine 44, and is rotationally coupled to an adapted rotary structure 7" by means of a rotary wing main bearing system 43. The rotary structure 7" is rotating around the rotation axis 8. In this exemplary embodiment, the jet turbine has the air inlet opening 38 facing the aircraft and the jet stream ducts 5" supplying the jet nozzle outlets 6 with pressurised exhaust gas. The pressurised exhaust gas from the jet turbine 44 is connected to the rotary structure 7" by means of a labyrinth gasket 41 (see enlarged image) in order to make the rotary structure 7" freely rotationally on the support structure 42. The jet turbine 44, enclosed in the support structure 42 provides the advantageous, so that the fuel supply 25 and the electric connections 24 do not have to extend through a rotary connection to the aircraft. Furthermore is the yaw system also made from a commercial off-the-shelf electromagnetic motor 47, connected to the rotary structure 7" by means of a belt drive 48.

Figure 11:
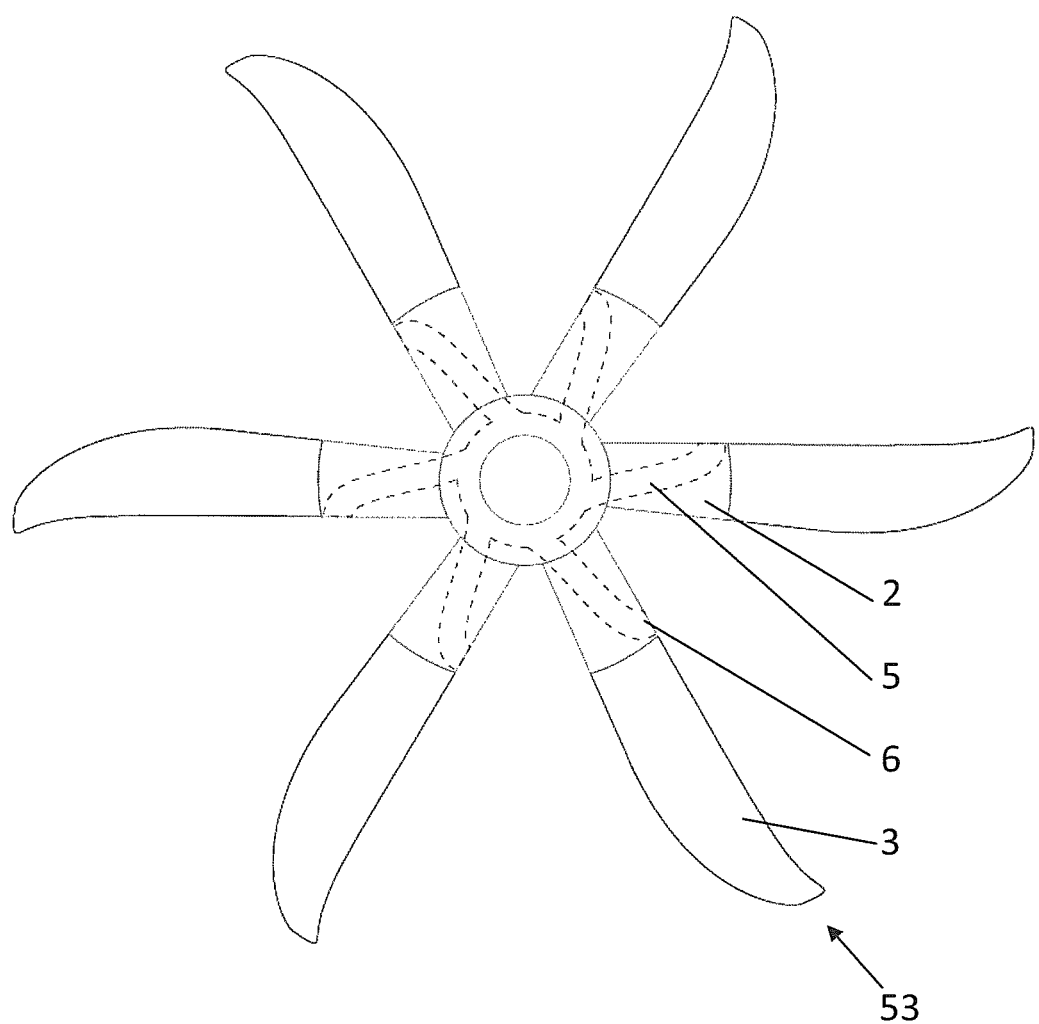
FIG. 11 illustrates a propeller-type rotor system according to the invention.

FIG. 11 illustrates a propeller-type rotor system 53 for turboprop-type airplanes. The principle corresponds to the principle of the rotor as shown in FIG. 5. However, the rotary axis is horizontal instead of vertical.

The invention claimed is:

1. A rotor system for an aircraft including a rotor (1) with a rotary structure (7, 7') mounted rotatable about a rotation axis (8) and supporting a proximal end (9) of at least one rotor blade (3), wherein the rotor system comprises at least one jet turbine (4, 4') for providing pressurised exhaust gas to the rotary structure (7, 7'), the rotary structure (7, 7') having at least one jet nozzle outlet (6) and at least one jet stream duct (5, 5') for transporting the pressurised exhaust gas from the jet turbine (4, 4') to the jet nozzle outlet (6) to cause rotation of the rotary structure (7, 7') by expelling the pressurised exhaust gas through the nozzle outlet (6), the rotor system having a support structure (20) for attaching the rotor system to an aircraft body, wherein only the rotary structure (7, 7') and not the rotor blade (3, 3') comprise a jet stream duct (5, 5') and a nozzle outlet (6), the rotor system comprising an adjuster for adjusting yaw of the aircraft body relative to the earth, the adjuster being shaftless connected to the rotary structure (7), and further comprising a magnetic coupling between the support structure and the rotary structure (7), wherein the magnetic coupling comprises an integrated electromagnetic motor (51) rotationally coupling the rotary structure (7) to the support structure (20), wherein the electromagnetic motor comprises at least one permanent magnet (18) on the rotary structure (7) and at least one electromagnet (19) on the support structure (20), wherein the electromagnetic motor controls the yaw by advancing or retarding relative rotation between the at least one electromagnet on the support structure and the at least one permanent magnet on the rotary structure.

2. A rotor system (1) for an aircraft in combination with an attitude control mechanism, the rotor system including a rotor (1) with a rotary structure (7, 7') mounted rotatable about a rotation axis (8) and supporting a proximal end (9) of at least one rotor blade (3), wherein the rotor system comprises at least one jet turbine (4, 4') for providing pressurised exhaust gas to the rotary structure (7, 7'), the rotary structure (7, 7') having at least one jet nozzle outlet (6) and at least one jet stream duct (5, 5') for transporting the pressurised exhaust gas from the jet turbine (4, 4') to the jet nozzle outlet (6) to cause rotation of the rotary structure (7, 7') by expelling the pressurised exhaust gas through the nozzle outlet (6), the rotor system having a support structure (20) for attaching the rotor system to an aircraft body, wherein only the rotary structure (7, 7') and not the rotor blade (3, 3') comprise a jet stream duct (5, 5') and a nozzle outlet (6), the attitude control mechanism comprising a 6-legged suspension with a first connection (35) connected to the support structure (20) and with a second connection (30) for connection to an aircraft body (31, 37), wherein the 6-legged suspension is created as a hexapod with six legs (34), the legs comprising a longitudinally extendable actuators (36), where the six legs are connected to the support structure (20) at three points and to the body 31 at three points such that each two adjacent legs have one common connection point at their one ends and two different connection points at their opposite ends, wherein the attitude control mechanism comprises the longitudinally extendable actuators for extending or shortening the legs and thereby displacing a centre of gravity (32) of the aircraft relatively to the vertical centre line (33) of the aircraft body (31) for controlled adjustment of attitude of the aircraft, wherein the rotary structure (7) is coupled to the support structure (20), the support structure (20) is located at the rotary structure (7) above and remote from the aircraft body, the hexapod is above the aircraft body, and no rotational rotor shaft extends from the rotary structure (7) to the aircraft body.

3. A rotor system according to claim 1, wherein the electromagnetic motor is of the asynchronous induction type motor.

4. Rotor system according to claim 1, wherein the jet turbine (4) is a radial flow type jet turbine located coaxially with the rotation axis (8) of the rotor system (1).

5. A rotor system according to claim 4, wherein the jet turbine (4) has a support structure (20) with a first side for non-rotational connection to an aircraft body (31, 37) and with an opposite, second side, which is rotationally coupled to a radial flow jet disc (14) with compressor blades (11), and wherein an inlet opening (12) for inlet of air is provided on the second side of the support structure (20).

6. Rotor system according to claim 5, wherein the jet disc (14) has turbine blades (17) provided in a plane of the ducts (5) of the rotary structure (7).

7. A rotor system for an aircraft including a rotor (1) with a rotary structure (7, 7') mounted rotatable about a rotation axis (8) and supporting a proximal end (9) of at least one rotor blade (3), wherein the rotor system comprises at least one jet turbine (4, 4') for providing pressurised exhaust gas to the rotary structure (7, 7'), the rotary structure (7, 7') having at least one jet nozzle outlet (6) and at least one jet stream duct (5, 5') for transporting the pressurised exhaust gas from the jet turbine (4, 4') to the jet nozzle outlet (6) to cause rotation of the rotary structure (7, 7') by expelling the pressurised exhaust gas through the nozzle outlet (6), wherein only the rotary structure (7, 7') and not the rotor blade (3, 3') comprise a jet stream duct (5, 5') and a nozzle outlet (6), wherein the jet turbine (4) is a radial flow type jet turbine located coaxially with the rotation axis (8) of the rotor system (1), wherein the jet turbine (4) has a support structure (20) with a first side for non-rotational connection to an aircraft body (31, 37) and with an opposite, second side, which is rotationally coupled to a radial flow jet disc (14) with compressor blades (11), and wherein an inlet opening (12) for inlet of air is provided on the second side of the support structure (20), wherein the jet disc (14) has a disc base (14') on which compressor blades (11) are provided, the compressor blades (11) having an adjacent part (11') fastened to the disc base (14') and a distal part (11"), being distal from the disc base (14'), wherein on the distal parts (11") of the compressor blades (11), a disc member (15) is provided, connecting the distal parts (11") of the compressor blades (11) with turbine blades (17), and wherein a combustion chamber (16) is provided on the support structure (20).

8. A rotor system according to claim 5, wherein the jet turbine comprises an integrated electromagnetic starter motor (50) coupling the jet disc (14) to the support structure (20).

9. A rotor system according to claim 8, wherein the electromagnetic starter motor has permanent magnets (21) as part of the disc jet (14) and electromagnets (22) as part of the support structure (20).

10. A rotor system according to claim 8, wherein the electromagnetic starter motor is of the asynchronous induction type motor.

11. A rotor system according to claim 1, wherein the aircraft comprises an aircraft body below the rotary structure and wherein the adjuster, the support structure, and the rotary structure are remote from the aircraft body.

* * * * *